United States Patent [19]

Layden

[11] 4,384,909
[45] May 24, 1983

[54] BONDING $Si_3N_4$ CERAMICS

[75] Inventor: George K. Layden, Wethersfield, Conn.

[73] Assignee: United Technologies Corporation, Hartford, Conn.

[21] Appl. No.: 322,099

[22] Filed: Nov. 16, 1981

[51] Int. Cl.$^3$ .................... C04B 35/58; C04B 35/72
[52] U.S. Cl. ............................ 156/89; 156/DIG. 99; 264/65; 264/332; 423/344; 428/446
[58] Field of Search ............... 501/56, 98, 97, 73, 501/10, 15, 41, 152, 153, 154; 264/60, 65, 332; 423/263, 344; 156/89; 428/446

[56] References Cited

U.S. PATENT DOCUMENTS

| | | | |
|---|---|---|---|
| 4,072,532 | 2/1978 | Fletcher et al. | 501/98 |
| 4,143,107 | 3/1979 | Ishii et al. | 501/98 |
| 4,234,343 | 11/1980 | Andersson | 501/98 |
| 4,264,550 | 4/1981 | Ezis | 264/332 |
| 4,280,850 | 7/1981 | Smith et al. | 501/97 |
| 4,324,356 | 4/1982 | Blair et al. | 264/65 X |
| 4,347,089 | 8/1982 | Loehman | 156/89 |
| 4,350,771 | 9/1982 | Smith | 501/97 |

FOREIGN PATENT DOCUMENTS 49-20370  5/1974  Japan .................... 156/89

OTHER PUBLICATIONS

Layden; G. K. "Development of SiAlON Materials" Report No. NASA CR 159675, Final Report Sep. 1979, 1-137 pages.

Primary Examiner—Helen M. McCarthy
Attorney, Agent, or Firm—Harry J. Gwinnell

[57] ABSTRACT

Compositions are disclosed for securing $Si_3N_4$ parts together, these compositions being in the $\beta'$-$Y_2Si_2O_7$—$Y_3Al_5O_{12}$ tetrahedron, e.g. compositions in mole % comprising (1) 15% $Si_3N_4$, 79.1% $Y_2Si_2O_7$ and 6.9% $Y_3Al_5O_{12}$ or (2) 25% $Si_2AlON_3$ and 75% $Y_3Al_5O_{12}Y$. A method of securing $Si_3N_4$ parts together comprises placing the composition between the parts to be bonded and heating to brazing temperature (about 1600° C.) in nitrogen.

4 Claims, No Drawings

BONDING SI₃N₄ CERAMICS

TECHNICAL FIELD

This invention relates to compounds suitable for bonding or joining ceramic parts made of $Si_3N_4$.

BACKGROUND ART

Parts made from $Si_3N_4$ are expected to find extended use in high temperature applications as, for example, in the hot parts of gas turbine engines or other load-carrying elements. To make such parts readily usable there must be a suitable composition for joining these parts to make composite structures that will maintain their integrity in use and under the stresses to which the composite may be subjected. Such compositions must serve to join the said $Si_3N_4$ pieces securely without detrimentally affecting the pieces joined by the composition.

The $\beta'$-$Y_2Si_2O_7$—$Y_3Al_5O_{12}$ compatibility tetrahedron establishes a group of compositions that it was hoped could be usable as a brazing material. Compatibility relationships in the Y—Si—Al—O—N system are described in a report to NASA, Report No. NASA CR 159675, dated September 1979 and also in a paper by Layden, No. 61-BN-79F, presented at the Fall meeting in October 1979 to the American Ceramic Society.

DISCLOSURE OF INVENTION

One feature of the invention is a family of compositions capable of successfully joining $Si_3N_4$ pieces together without any detrimental effect on the pieces. Another feature is a series of compositions that may be formed into a glass frit, rod, or sheet for use as a brazing material between $Si_3N_4$ parts. Another feature is a series of compositions that may be used as brazing material and that crystallize upon suitable heat treatment to bond the parts together, these compositions having adequate wetting, flow, and mechanical compatibility with the $Si_3N_4$.

According to the invention, compositions encompassed by the $\beta'$-$Y_2Si_2O_7$—$Y_3Al_5O_{12}$ tetrahedron are suitable as brazing or joining compositions as they have the necessary characteristics such as wetting, flow and mechanical compatability with the $Si_3N_4$ parts. More specifically compositions in the tetrahedron $Si_{3-x}Al_xO_xN_{4-x}$ (where $0<x<2$) —$Y_2Si_2O_7$—$Y_3Al_5O_{12}$ have been found to be suitable brazing compositions. Certain of these compositions, for example, composition 1:

15 m/o $Si_3N_4$ + 79.1 m/o $Y_2Si_2O_7$ + 6.9 m/o $Y_3Al_5O_{12}$ forms a viscous liquid that can be cooled from above the liquidus temperature to form glass that may be used as brazing material between $Si_3N_4$ parts and other compositions, for example, composition 2:

25 m/o $Si_2AlON_3$ + 75 m/o $Y_3Al_5O_{12}$ which form low viscosity liquids at brazing temperature which tend to crystallize on cooling. The use of the other rare earths alone or in combination with yttrium in the above composites will also produce suitable brazing material for $Si_3N_4$.

BEST MODE FOR CARRYING OUT THE INVENTION

For the purpose of securing $Si_3N_4$ parts together particularly in making composite parts the bonding or brazing material must be compatible with the material of the parts to be joined. The solid phase compatibility in portions of the Y—Si—Al—O—N system relevant to $Si_3N_4$ and $Si_{3-x}Al_xO_xN_{4-x}$ (where x is between 0 and 2) are readily determined from the known models of the Y—Si—Al—O—N system which show the solid phase compatibility tetrahedra. As above stated, such models are shown and described in the NASA report, CR 159675, of September 1979 and a Layden paper, 61-BN-79F, delivered at the Fall meeting of the American Ceramic Society in October 1979.

A single tetrahedron encompasses compatibility with $Si_3N_4$ over the entire range of $Si_{3-x}Al_xO_xN_{4-x}$ (where $0<x<2$) compositions. This is a tetrahedron $\beta'$-$Y_2Si_2O_7$—$Y_3Al_5O_{12}$ and this encompasses compositions exhibiting a wide range of solidus temperatures and liquid viscosities. The compositions are found to be compatible with $Si_3N_4$ in mechanical and structural respects, and the liquid phase exhibits the desired wetting and flow characteristics.

For example, two compositions from this $\beta$ tetrahedron representing extremes of a broad spectrum of liquid properties available in this tetrahedron at a temperature of 1600° C. are:

(1) 15 m/o $Si_3N_4$ + 79.1 m/o $Y_2Si_2O_7$ + 6.9 m/o $Y_3Al_5O_{12}$ (2) 25 m/o $Si_2AlON_3$ + 75 m/o $Y_3Al_5O_{12}$

Composition 1 represents a highly viscous liquid that cools to a glass and composition 2 is a fluid liquid that is expected to crystallize on cooling. These compositions are given in weight percent of actual constituents as follows:

TABLE I

| Composition | $Si_3N_4$ | AlN | $Al_2O_3$ | $Y_2O_3$ | $SiO_2$ |
|---|---|---|---|---|---|
| (1) | 6.59 | 0 | 4.50 | 60.12 | 28.80 |
| (2) | 4.88 | 0.71 | 41.55 | 52.87 | 0 |

In using these compositions for bonding parts made of $Si_3N_4$, materials were prepared in one gram batches and blended with a mortar and pestle, under methanol, to a smooth, creamy consistency. The $Si_3N_4$ parts were polished and dried with methanol and a thin layer of the methanol slurry was placed between the parts to be joined. The assemblies were placed on boron nitride plaques and fired at 1600° C. in nitrogen at one atmosphere for 10 minutes and then cooled. Upon visual and macrographic examination, both compositions wet the $Si_3N_4$ parts and produced well-formed gussets at the braze joint.

Upon metallographic examination of the polished joints, composition 1 showed some attack and penetration of the $Si_3N_4$ surface, with good bonding of the glass bonding composition to the surfaces. Composition 2 showed more extensive reaction with the $Si_3N_4$ than did composition 1 and exhibited dendritic crystallization. Excellent mechanical compatibility of the braze joint was apparent in both instances. When braze joints were impacted in such a fashion as to shear the braze joint, in some instances the $Si_3N_4$ parts failed while the braze joint remained intact, giving evidence of the superior strength of the joint.

Accordingly, it is believed that those compositions encompassed by the $\beta'$-$Y_2Si_2O_7$—$Y_3Al_5O_{12}$ tetrahedron are suitable as brazing or joining compositions as they would have the necessary characteristics such as wetting, flow and mechanical compatibility with the $Si_3N_4$ parts. It is also expected that the yttrium may be replaced in whole or in part by any of the other rare earth elements having similar characteristics to yttrium.

The tetrahedron would be the same as above with R (rare earth) substituted for Y. Thus the tetrahedron would be $Si_{3-x}Al_xO_xN_{4-x}$ (where $0<x<2$) —$R_2Si_2O_7$—$R_3Al_5O_{12}$.

Although the invention has been shown and described with respect to a preferred embodiment thereof, it should be understood by those skilled in the art that other various changes and omissions in the form and detail thereof may be made therein without departing from the spirit and the scope of the invention.

I claim:

1. A composition particularly adapted to joining $Si_3N_4$ parts comprising, in mole percent, 15% $Si_3N_4$, 79.1% $Y_2Si_2O_7$ and 6.9% $Y_3Al_5O_{12}$.

2. A composition particularly adapted to joining $Si_3N_4$ parts comprising, in mole percent, 25% $Si_2AlON_3$ and 75% $Y_3Al_5O_{12}$.

3. A method of bonding $Si_3N_4$ parts together comprising placing between the parts to be bonded a composition comprising 15% $Si_3N_4$, 79.1% $Y_2Si_2O_7$ and 6.9% $Y_3Al_5O_{12}$ and heating to brazing temperature in nitrogen.

4. A method of bonding $Si_3N_4$ parts together comprising placing between the parts to be bonded a composition comprising 25% $Si_2AlON_3$ and 75% $Y_3Al_5O_{12}$ and heating to brazing temperature in nitrogen.

* * * * *